United States Patent
Avery

(10) Patent No.: US 12,103,395 B2
(45) Date of Patent: Oct. 1, 2024

(54) COMBINED HEAD UP DISPLAY (HUD) AND CAMERA SYSTEM

(71) Applicant: Panasonic Automotive Systems Company of America, Division of Panasonic Corporation of North America, Peachtree City, GA (US)

(72) Inventor: John Avery, Newnan, GA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 0 days.

(21) Appl. No.: 18/129,563

(22) Filed: Mar. 31, 2023

(65) Prior Publication Data

US 2023/0234443 A1     Jul. 27, 2023

Related U.S. Application Data

(62) Division of application No. 16/585,428, filed on Sep. 27, 2019, now Pat. No. 11,642,961, which is a division of application No. 15/668,903, filed on Aug. 4, 2017, now abandoned.

(60) Provisional application No. 62/370,991, filed on Aug. 4, 2016.

(51) Int. Cl.
| | |
|---|---|
| *B60K 35/00* | (2024.01) |
| *H04N 7/18* | (2006.01) |
| *B60K 35/10* | (2024.01) |
| *B60K 35/23* | (2024.01) |
| *B60K 35/81* | (2024.01) |

(52) U.S. Cl.
CPC ............ *B60K 35/00* (2013.01); *H04N 7/183* (2013.01); *B60K 35/10* (2024.01); *B60K 35/23* (2024.01); *B60K 35/81* (2024.01); *B60K 2360/149* (2024.01); *B60K 2360/21* (2024.01); *B60K 2360/334* (2024.01)

(58) Field of Classification Search
CPC .................... H04N 7/183; B60K 35/00; B60K 2350/2052; B60K 2350/352
See application file for complete search history.

(56) References Cited

U.S. PATENT DOCUMENTS

| | | | | |
|---|---|---|---|---|
| 2010/0066984 A1* | 3/2010 | Horiuchi | .............. | G03B 21/208 353/97 |
| 2016/0109714 A1* | 4/2016 | Chen | .................. | G02B 27/0179 353/13 |
| 2016/0150218 A1* | 5/2016 | Yoon | .................. | G02B 27/0101 348/77 |
| 2017/0059872 A1* | 3/2017 | Banyay | .............. | G02B 27/0179 |
| 2017/0160545 A1* | 6/2017 | Sugiyama | .............. | B60K 35/00 |
| 2018/0350236 A1* | 12/2018 | Yamaguchi | ........ | G08G 1/09626 |

* cited by examiner

Primary Examiner — Tsion B Owens
(74) Attorney, Agent, or Firm — Laurence S. Roach, Esq.

(57) ABSTRACT

An optical arrangement for a motor vehicle includes a head up display light field emitter that emits a light field. At least one mirror is positioned to reflect the light field such that the light field is again reflected by a windshield of the vehicle, and such that the light field is visible to a driver of the vehicle as a virtual image. The at least one mirror has a transparent section. A driver monitoring camera is positioned to capture an image of a face of the driver through the transparent section of the at least one mirror.

14 Claims, 6 Drawing Sheets

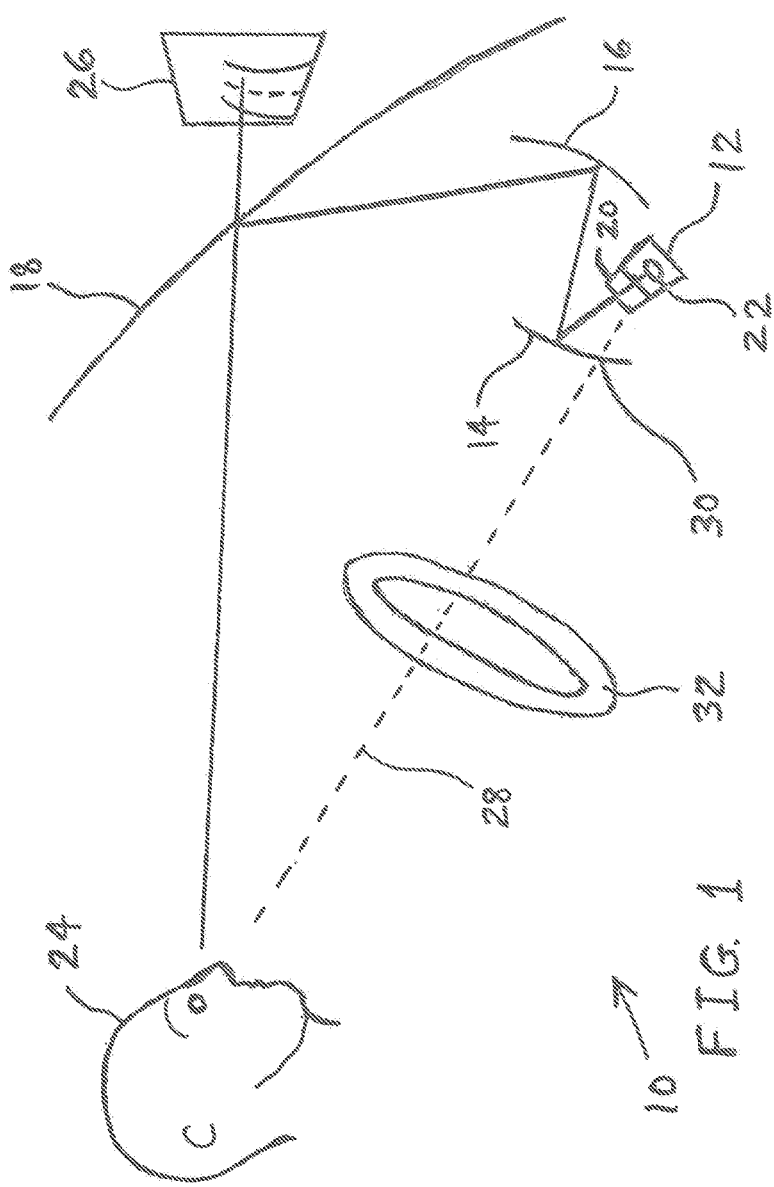

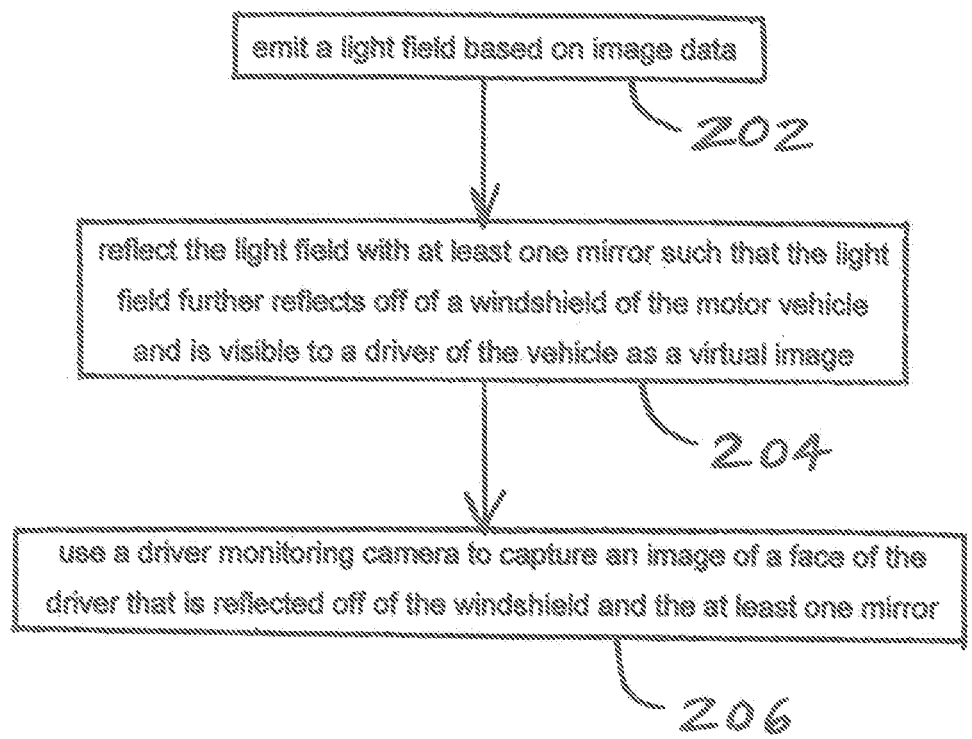

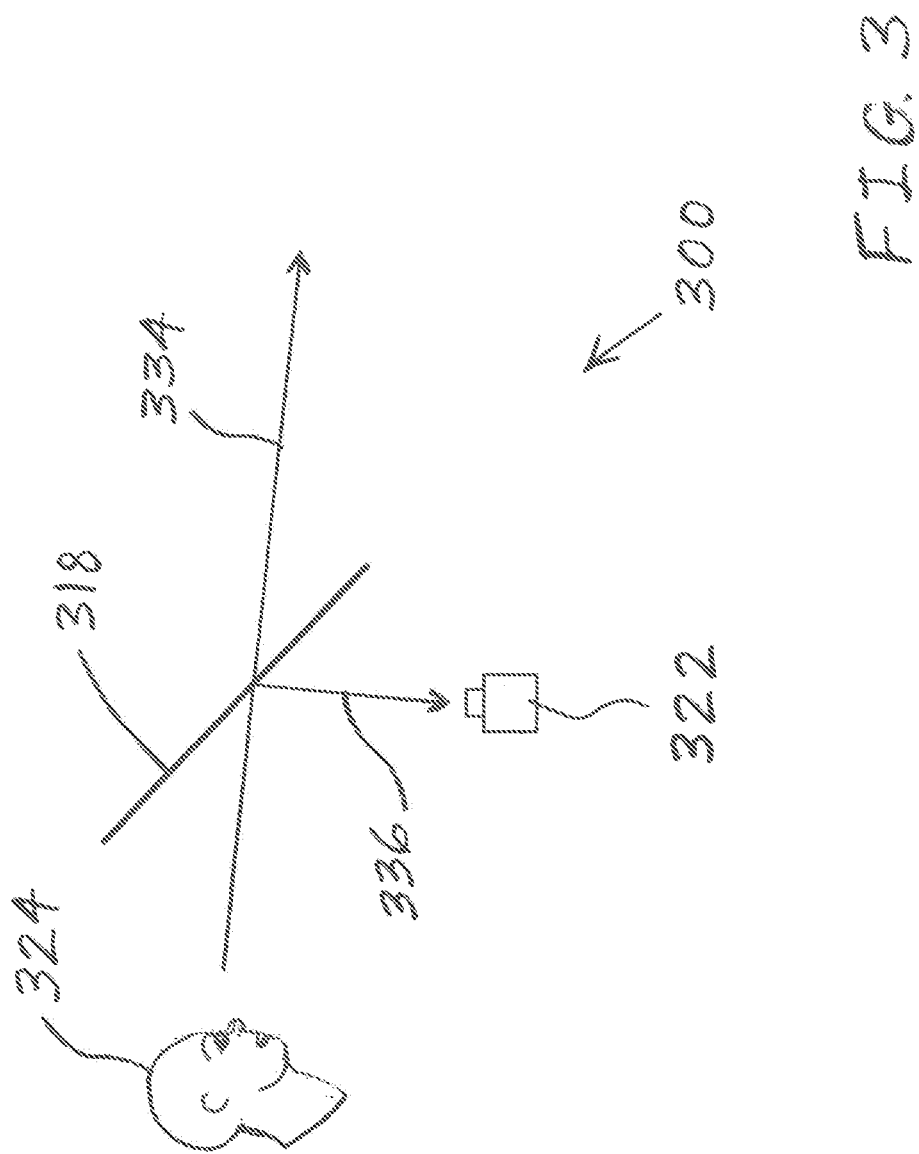

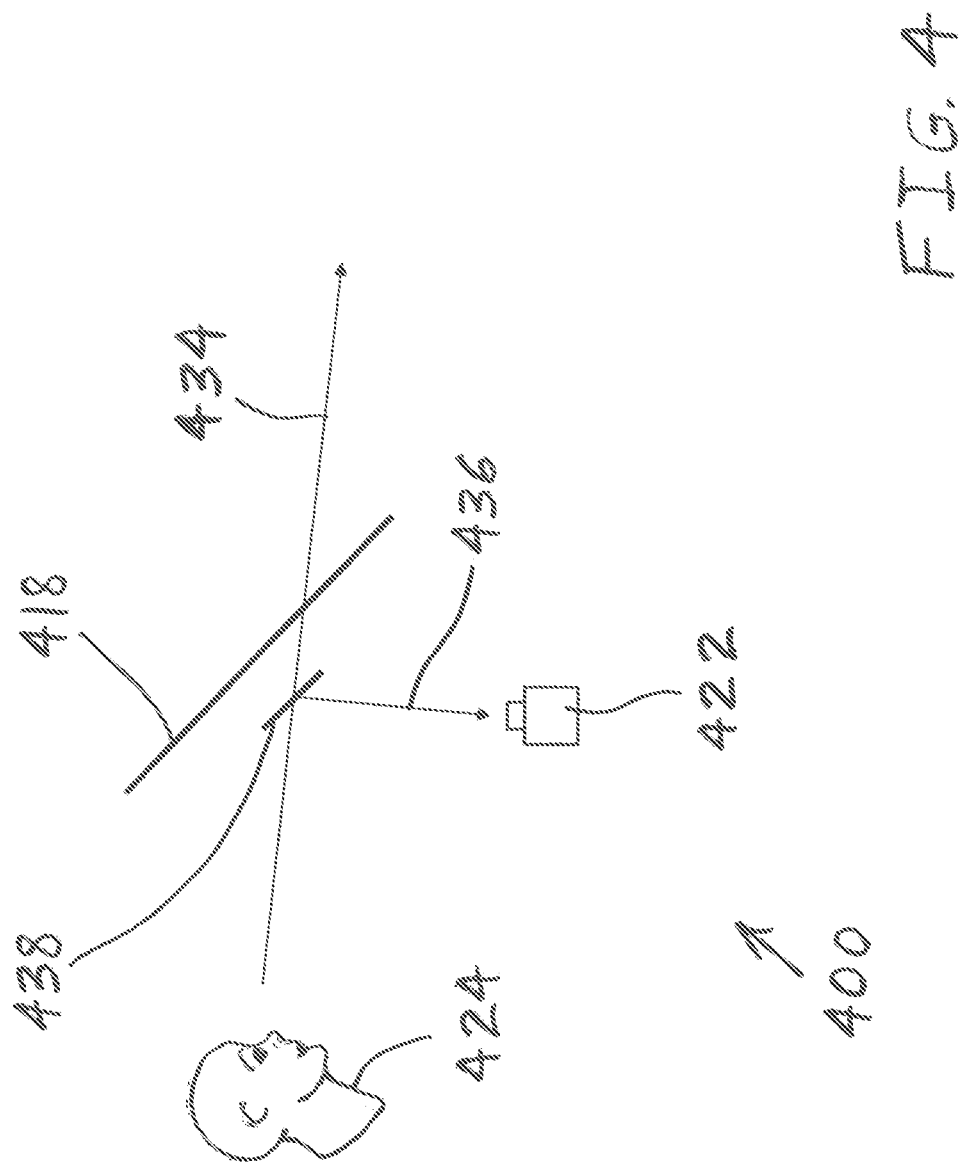

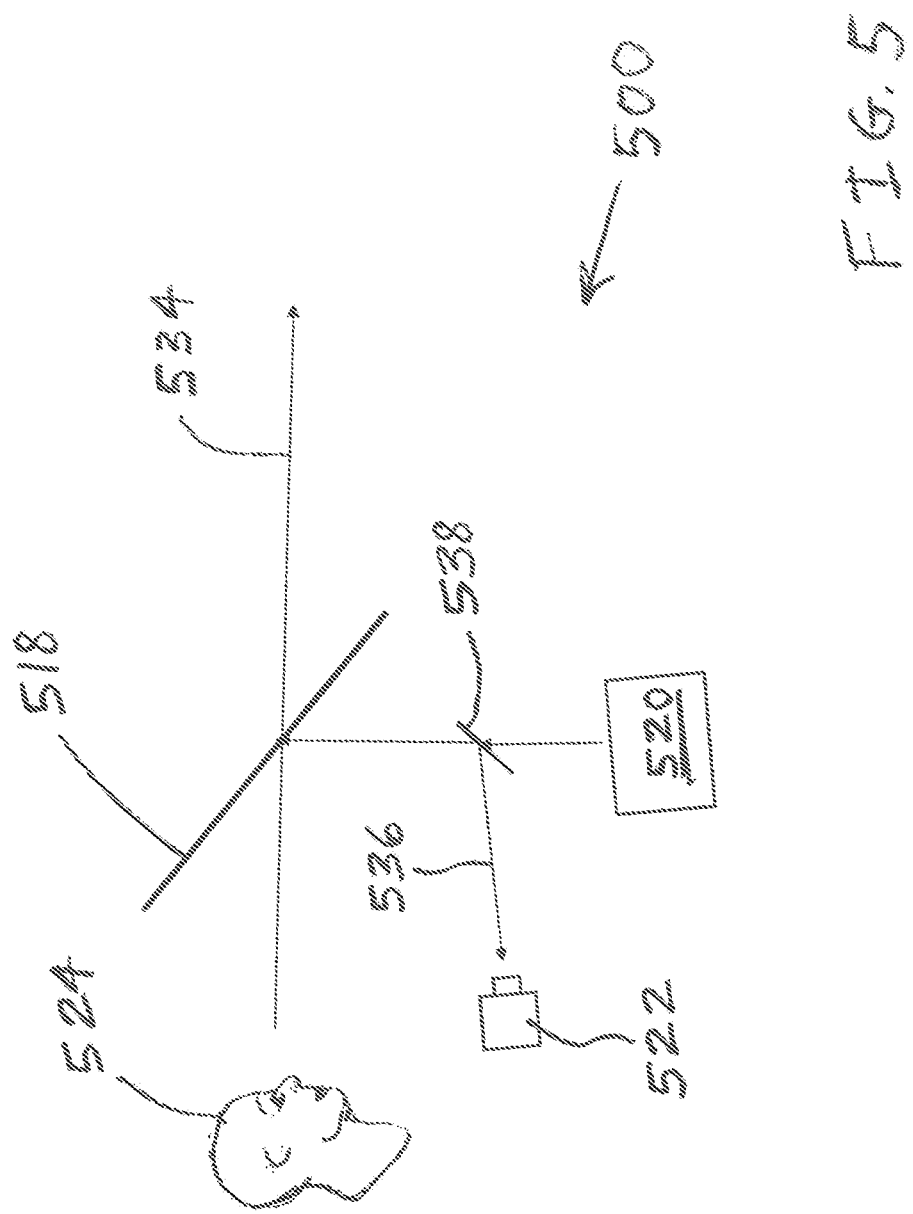

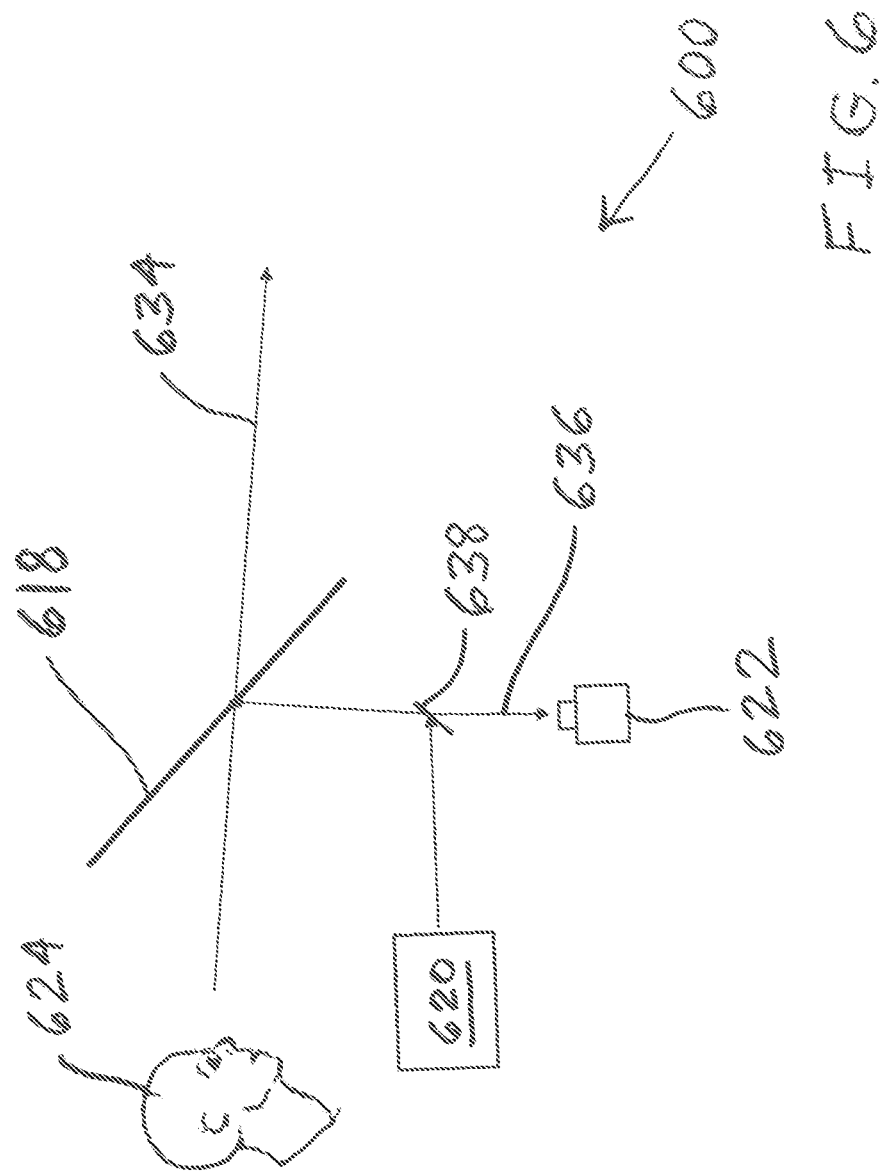

COMBINED HEAD UP DISPLAY (HUD) AND CAMERA SYSTEM

CROSS-REFERENCED TO RELATED APPLICATIONS

This application is a divisional application which claims benefit of U.S. application Ser. No. 16/585,428 filed on Sep. 27, 2019, which claims benefit of U.S. application Ser. No. 15/668,903 filed on Aug. 4, 2017, which claims benefit of U.S. Provisional Application No. 62/370,991 filed on Aug. 4, 2016, the disclosures of which are hereby incorporated by reference in their entireties for all purposes.

FIELD OF THE INVENTION

The disclosure relates to combining a head up display (HUD) and a driver monitoring camera in a motor vehicle.

BACKGROUND OF THE INVENTION

A head up display emits light that reflects from the front windshield to be seen by the driver. The light appears to come from a virtual image in front of the driver and in front of the windshield.

Conventional head up displays create the virtual image by first using a display to create an image. Next, the light from the image is reflected from one or more mirrors, and then the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Driver monitoring cameras are currently difficult to place in the vehicle. The driver monitoring cameras need to have a clear, unobstructed front angle view of the driver, but the cameras cannot be allowed to obstruct the driver's view of the road. Today's systems are located on the steering column or re mounted on top of the dash. Both locations are non-optimal since their view can be obstructed, and the camera itself can be distracting to the driver.

SUMMARY

The present invention may provide an arrangement in which a driver monitoring camera is combined in the same module housing with the HUD light field emitter. The camera and HUD light field emitter pray share the same optics, such as a same mirror. Combining the camera with the HUD enables the same optics that deliver the visual HUD display to the driver to also be used to deliver the image of the driver's face to the camera. The driver monitoring camera may be combined with any part of the HUD optics. For example, any of the reflecting mirrors may include a small hole through which the camera can see the image of the driver's face. The camera may also be placed alongside the HUD package itself and receive the image of the driver's face after the image has been reflected off of the windshield alone or windshield plus any number of mirrors or lenses. Additionally, the image may be reflected off coated lenses that reflect IR light but transmit visible light.

In one embodiment, the invention comprises an optical arrangement for a motor vehicle, including a head up display light field emitter that emits a light field. At least one mirror is positioned to reflect the light field such that the light field is again reflected by a windshield of the vehicle, and such that the light field is visible to a driver of the vehicle as a virtual image. A driver monitoring camera is positioned to capture an image of a face of the driver that is reflected off of the windshield directly or including one or more mirrors. Alternatively, it is possible for the driver monitoring camera to catch the reflection directly off the windshield without the use of any mirrors.

In another embodiment, the invention comprises an optical method for a motor vehicle, including emitting a light field based on image data. The light field is reflected with at least one mirror such that the light field further reflects off of a windshield of the motor vehicle and is visible to a driver of the vehicle as a virtual image. A driver monitoring camera is used to capture an image of a face of the driver that, is reflected off of the windshield and the one or more mirrors.

In yet another embodiment, the invention comprises an optical arrangement for a motor vehicle, including a head up display light field emitter that emits a light field. At least one mirror is positioned to reflect the light field such that the light field is again reflected by a windshield of the vehicle, and such that the light field is visible to a driver of the vehicle as a virtual image. At least one mirror has a transparent section for IR light. A driver monitoring camera is positioned to capture an image of a face of the driver through the transparent section of the at least one mirror.

In still another embodiment, the invention comprises an optical arrangement for a motor vehicle, including a head up display light field emitter that emits a light field. At least one optical element is positioned to reflect the light field such that the light field is again reflected by a windshield of the vehicle, and such that the light field is visible to a driver of the vehicle as a virtual image. The at least one optical element includes at least one mirror and/or at least one lens. The at least one optical element is reflective to visible light and transparent for IR light. A driver monitoring camera is positioned to capture an IR image of a face of the driver reflected off of the windshield acrd passing through the at least one optical element.

An advantage of the present invention is that it solves the problem of where to place a driver monitoring camera by combining it with the Heads Up Display (HUD).

BRIEF DESCRIPTION OF THE DRAWINGS

A better understanding of the present invention will be had upon reference to the following description in conjunction with the accompanying drawings.

FIG. 1 is a schematic view of one example embodiment of a combined HUD and driver monitoring camera arrangement of the present invention.

FIG. 2 is a flow chart of one embodiment of an optical method of the present invention for a motor vehicle.

FIG. 3 is a schematic view of another example embodiment of a combined HUD and driver monitoring camera arrangement of the present invention.

FIG. 4 is a schematic view of yet another example embodiment of a combined HUD and driver monitoring camera arrangement of the present invention.

FIG. 5 is a schematic view of still another example embodiment of a combined HUD and driver monitoring camera arrangement of the present invention.

FIG. 6 is a schematic view of a further example embodiment of a combined HUD and driver monitoring camera arrangement of the present invention.

DETAILED DESCRIPTION OF THE PREFERRED EMBODIMENTS

FIG. 1 illustrates one example embodiment of a combined HUD and driver monitoring camera arrangement 10 of the present invention, including a HUD display screen and driver monitoring camera module 12, a fold mirror 14, an aspheric mirror 16, and a windshield 18. Module 12 includes a HUD display screen 20 and a driver monitoring camera 22. HUD display screen 20 and driver monitoring camera 22 may be disposed within a common housing, or may be disposed adjacent to each other. HUD display screen 20 and driver monitoring camera 22 may be illustrated as being physically separated by a substantial distance in FIG. 1 for ease of illustration, but may be close enough together to share optics including mirrors 14, 16 and windshield 18. That is, a light field from screen 20 may be reflected by mirrors 14, 16 and windshield 18 and be seen by a driver 24. Similarly, an image of a face of driver 24 may be reflected by windshield 18, mirrors 16, 14 and be captured by camera 22.

During use, HUD display screen 20 emits a light field that is reflected sequentially off of mirror 14, mirror 16, and windshield 18 such that the light field is visible to driver 24 as a virtual image 26 that appears to be disposed over the front bumper of the vehicle. Camera 22 captures an image of the face of driver 24 that is reflected sequentially off of windshield 18, mirror 16, and mirror 14.

In another embodiment, instead of capturing the image of the driver's face as a reflection off of windshield 18, mirror 16, and mirror 14, camera 22 captures the image of the driver's face directly along imaginary line 28 and through a throughhole 30 in mirror 14. Instead of throughhole 30, mirror 14 may have a transparent section through which camera 22 may see the driver's face. Imaginary line 28 may extend through an air gap in steering wheel 32, or may be disposed outside of steering wheel 32. It is also possible for imaginary line 28 to be offset from mirror 14 such that no throughhole or transparent section in mirror 14 is needed.

FIG. 2 is a flow chart of one embodiment of an optical method 200 of the present invention for a motor vehicle. In a first step 202, a light field is emitted based on image data. For example, HUD display screen 20 may emit a light field based on image data from an electronic processor (not shown).

In a next step 204, the light field is reflected with at least one mirror such that light field further reflects off of a windshield of the motor vehicle and is visible to a driver of the vehicle as a virtual image. For example, the light field emitted by HUD display screen 20 may be reflected by mirrors 14, 16 such that the light field further reflects off of windshield 18 of the motor vehicle and is visible to driver 24 of the vehicle as a virtual image 26.

In a final step 206, a driver monitoring camera is used to capture an image of a face of the driver that is reflected off of the windshield and the at least one mirror. For example, driver monitoring camera 22 may be used to capture an image of a face of driver 24 that is reflected off of windshield 18 and mirrors 14, 16.

FIGS. 3-7 illustrate embodiments of an inventive combined HUD and driver monitoring camera arrangement including use of a coating that is either reflective for infrared (IR) light and transparent for visible light, or vice versa (e.g., transparent for IR and reflective for visible). This makes it possible for a windshield or optical element to function as a lens in one spectrum while functioning as a mirror in the other spectrum. The windshield or optical element functioning as both a lens and a mirror enables the camera to get a clear image of the face while not interfering with the HUD image presented to the driver.

Arrangement 300 includes a windshield 318 and a camera 322, and may not include a HUD. Windshield 318 includes a coating that is reflective of IR energy and at least partially transparent to visible light. Thus, driver 324 may see the road through windshield 318, as indicated at 334, and windshield 318 may reflect IR light to camera 322, as indicated at 336, such that camera 322 may capture images of driver 324.

Arrangement 400 includes a windshield 418, a camera 422, and a combiner (lens) 438, and may not include a HUD. Combiner 438 includes a coating that is reflective of IR energy and at least partially transparent to visible light. Thus, driver 424 may see the road through windshield 418 and combiner 438, as indicated at 434, and combiner 438 may reflect IR light to camera 422, as indicated at 436, such that camera 422 may capture images of driver 424.

Arrangement 500 includes a windshield 518, a camera 522, at least one optical element 538 which may include at least one lens and/or at least one mirror, and a HUD display screen 520. Windshield 518 includes a coating that is reflective of IR energy and at least partially transparent to visible light. Optical element 538 is reflective of IR energy and transparent to visible light, perhaps by virtue of including a coating with these properties. Thus, driver 524 may see the road through windshield 518, as indicated at 534, and optical element 538 may reflect IR light to camera 522, as indicated at 536, such that camera 522 may capture images of driver 524. Further, optical element 538 does not interfere with a light field that is emitted by HUD display screen 520 and reflected off windshield 518 to driver 524.

Arrangement 600 includes a windshield 618, a camera 622, at least one optical element 638 which may include at least one lens and/or at least one mirror, and a HUD display screen 620. Windshield 618 includes a coating that is reflective of IR energy and at least partially transparent to visible light. Optical element 638 is transparent to IR energy and reflective of visible light, perhaps by virtue of including a coating with these properties. Thus, driver 624 may see the road through windshield 618, as indicated at 634, and optical element 638 may pass IR light to camera 622, as indicated at 636, such that camera 622 may capture images of driver 624. Further, optical element 638 reflects a light field that is emitted by HUD display screen 620 such that the light field is reflected off windshield 618 to driver 624. The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An optical arrangement for a motor vehicle, the arrangement comprising:
   a head up display light field emitter configured to emit a field of visible light;
   at least one optical element that is reflective to visible light and transparent for infrared light, the at least one optical element being positioned to reflect the light field such that the light field is again reflected by a windshield of the vehicle, and such that the light field is visible to a driver of the vehicle as a virtual image, the at least one optical element including at least one mirror and/or at least one lens, the at least one optical element including a section that is transparent to infrared light, and the transparent section of the at least one optical element comprising a throughhole; and a driver monitoring camera is positioned to capture an infrared image of a face of the driver reflected off the windshield and passing through the at least one optical element.

2. The optical arrangement of claim 1 wherein the at least one optical element includes a coating that is reflective to visible light.

3. The optical arrangement of claim 1 further comprising an electronic processor configured to:
receive image data from the camera; and
change an operational parameter of the vehicle dependent upon the image data.

4. The optical arrangement of claim 1 wherein the head up display light field emitter and the driver monitoring camera are disposed within a common housing.

5. The optical arrangement of claim 1 wherein the head up display light field emitter and the driver monitoring camera are adjacent to each other.

6. The optical arrangement of claim 1 further comprising an electronic processor configured to:
receive image data from the camera; and
cause a stimulus to be presented to the driver dependent upon the image data.

7. The optical arrangement of claim 6 wherein the stimulus is presented to the driver within the virtual image produced by the head up display light field emitter.

8. The optical arrangement of claim 1 wherein the at least one optical element comprises a fold mirror and an aspheric mirror.

9. The optical arrangement of claim 8 wherein the fold mirror includes the section that is transparent to infrared light.

10. An optical method for a motor vehicle, the method comprising:
emitting a visible light field based on image data;
positioning at least one optical element that is reflective to visible light and transparent for infrared light to reflect the light field such that the light field is again reflected by a windshield of the vehicle, and such that the light field is visible to a driver of the vehicle as a virtual image, the at least one optical element including at least one mirror and/or at least one lens, the at least one optical element including a section that is transparent to infrared light, the transparent section of the at least one optical element comprising a throughhole; and
using a driver monitoring camera to capture an infrared image of a face of the driver reflected off the windshield and passing through the at least one optical element.

11. The method of claim 10 further comprising changing an operational parameter of the vehicle dependent upon image data from the camera.

12. The method of claim 10 further comprising causing a stimulus to be presented to the driver dependent upon image data from the camera.

13. The method of claim 12 wherein the stimulus is presented to the driver within the virtual image.

14. The method of claim 10 wherein the at least one optical element comprises a fold mirror and an aspheric mirror, the fold mirror including the section that is transparent to infrared light.

\* \* \* \* \*